US005396205A

United States Patent [19]

Takahashi et al.

[11] Patent Number: 5,396,205

[45] Date of Patent: Mar. 7, 1995

[54] UNSPLICED SUPERCONDUCTING COIL DEVICE WITH HIGH STABILITY

[75] Inventors: Ryukichi Takahashi, Hitachiota; Fumio Iida; Naofumi Tada, both of Hitachi, all of Japan

[73] Assignee: Hitachi, Ltd., Tokyo, Japan

[21] Appl. No.: 873,165

[22] Filed: Apr. 24, 1992

[30] Foreign Application Priority Data

Apr. 26, 1991 [JP] Japan .................................. 3-096698

[51] Int. Cl.[6] .......................... H01F 1/00; H01F 7/22; H01F 41/04; B60L 13/04

[52] U.S. Cl. ............................. 335/216; 336/DIG. 1; 505/880; 505/924; 505/903

[58] Field of Search ................ 335/216; 505/705, 880, 505/924, 903; 336/DIG. 1

[56] References Cited

U.S. PATENT DOCUMENTS 4,727,346 2/1988 Westphal ............................ 335/216

FOREIGN PATENT DOCUMENTS 387072 of 0000 European Pat. Off. .
0387072 8/1990 European Pat. Off. ............ 335/216
570215 of 0000 France .
077207 of 0000 Japan .
0160405 12/1980 Japan .................................. 335/216
0105530 6/1983 Japan .................................. 335/216
0192207 8/1988 Japan .................................. 335/216
3099408 4/1991 Japan .................................. 335/216
3261110 11/1991 Japan ........................... 336/DIG. 1

*Primary Examiner*—Leo P. Picard
*Assistant Examiner*—Stephen T. Ryan
*Attorney, Agent, or Firm*—Antonelli, Terry, Stout & Karus

[57] ABSTRACT

A tightly wound superconducting coil device includes a cooling medium vessel, a coil winding disposed in the cooling medium vessel, the coil winding including an unspliced superconducting wire and having a configuration such that a cooling medium disposed in the cooling medium vessel does not contact the unspliced superconducting wire, and an insulating member disposed between the coil winding and the cooling medium vessel, wherein a portion of the unspliced superconducting wire forming outer portions of the coil winding on two opposite sides of the coil winding has a composition which causes a stability margin of the outer portions of the coil winding to be greater than a stability margin of a remaining portion of the coil winding.

4 Claims, 2 Drawing Sheets

UNSPLICED SUPERCONDUCTING COIL DEVICE WITH HIGH STABILITY

BACKGROUND OF THE INVENTION

The present invention relates to a superconducting coil device in which stability of a tightly wound superconducting coil is improved and resistance to quenching is increased.

As a method for preventing coil quenching due to disturbances at the surface portion of a wound wire in a tightly wound superconducting coil, there is known a method in which spring members are inserted between the superconducting coil and a coil vessel in which a cooling medium is enclosed so that quenching of the superconducting coil due to heat produced by friction is prevented by suppressing movements of the coil due to vibration as described in JP-A-1'-194308. Further, there are known methods in which low friction material is inserted between the superconducting coil and an insulating material disposed on the inner surface of the coil vessel in order to reduce heat produced by friction as described in JP-A-57-124406 and JP-A-57-178306; a method in which heat insulating members composed of an insulator having a small friction coefficient and a small thermal conductivity are disposed at a predetermined interval on the surface of the superconducting coil, which members are supported by the coil vessel, in order to prevent quenching due to penetration of heat produced by friction from the surface of the coil as described in JP-A-57-63809; a method in which the superconducting coil is secured to an internal vessel through a metal pipe through which a cryogenic medium flows in order to prevent quenching due to penetration of heat produced by friction from the surface of the superconducting coil as described in JP-A-57-63808, etc.

SUMMARY OF THE INVENTION

All the prior art techniques described above relate to methods by which disturbances causing quenching of the superconducting coil are reduced or little heat produced by the disturbances is transferred to the superconducting coil. However, in reality, the resistance to quenching of a tightly wound superconducting coil has been little improved. That is, none of the prior art techniques has yet proved satisfactory for preventing the quenching of such a superconducting coil.

The object of the present invention is to provide a superconducting coil device in which drawbacks of the prior art techniques described above are removed and the resistance to quenching is increased.

In order to achieve the above object, a superconducting coil device according to an aspect of the present invention is a tightly wound superconducting coil constructed by a coil winding having no cooling medium brought directly into contact with a superconductor, a cooling medium vessel enclosing the coil winding, and an insulating material disposed between the coil winding and the cooling medium vessel, in which a stability margin is greater at the outer portions of the coil winding on two opposite sides of the coil winding than at a remaining portion of the coil winding.

Copper may be used as a stabilizer for the superconductor at the surface portion of the coil winding and the superconductor may be covered with aluminum.

The transversal cross-section of the superconductor at the surface portion of the coil winding may be greater than that at the other portion.

Superconductors having different stability margins and having no connection (i.e. no splice) may be wound for the coil winding at the surface portion and the coil winding at the other portion, respectively.

A superconducting coil device according to another aspect of the present invention is a tightly wound superconducting coil constructed by a coil winding having no cooling medium brought directly into contact with a superconductor, a cooling medium vessel enclosing the coil winding, and an insulating material disposed between the coil winding and the cooling medium vessel, in which a stability margin is greater at the outer portions of the coil winding on all sides of the coil winding than at a remaining portion of the coil winding.

Copper may be used as a stabilizer for the superconductor at the surface portion of the coil winding and the superconductor may be covered with aluminum.

The transversal cross-section of the superconductor at the surface portion of the coil winding may be greater than that at the other portion.

A superconducting coil device according to still another aspect of the present invention is a tightly wound superconducting coil constructed by a coil winding having no cooling medium brought directly into contact with a superconductor, a cooling medium vessel enclosing the coil winding, and an insulating material disposed between the coil winding and the cooling medium vessel, in which the surface portion of the coil winding is constructed by a normal metal such as copper and aluminum.

DESCRIPTION OF THE PREFERRED EMBODIMENTS

Prior to explanation of the embodiments of the present invention, the principle of the present invention will be explained.

In a superconducting magnetically levitated vehicle there are disposed superconducting coils on the vehicle side and normally conductive short-circuit coils on the ground side, and is levitated by repulsive force produced by electromagnetic induction between the superconducting coils and the ground side coils when the vehicle is running. On the other hand, propulsion of the vehicle is effected by a linear-synchronous-motor method using an interaction between normally conductive propulsive coils disposed separately on the ground side and the superconducting coils disposed on the vehicle side in which propulsive force is obtained by inverting the current flowing through the propulsive coils.

Figure 5:
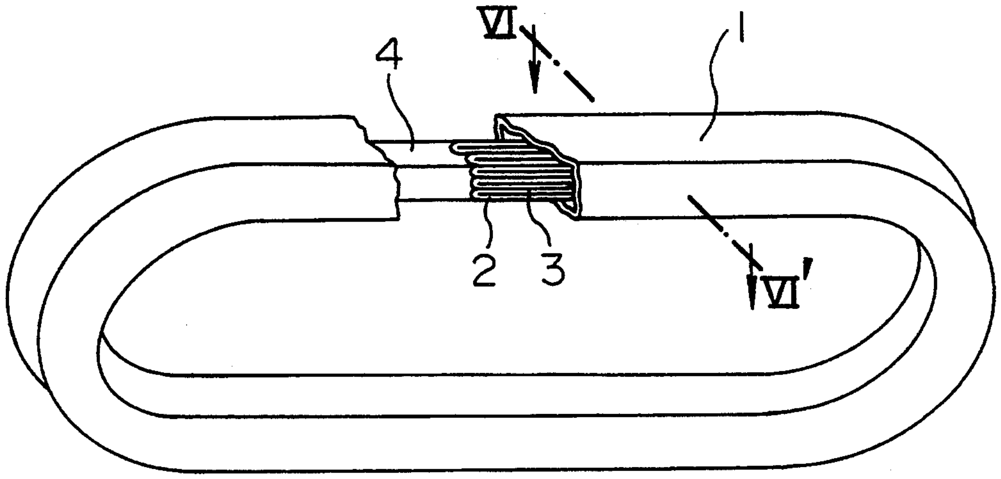
FIG. 5 is a perspective view indicating the outline of a general racetrack-shaped superconducting coil.

The superconducting coil used for a superconducting magnetically levitated vehicle is generally racetrack-shaped as indicated in FIG. 5, and it is necessary to reduce the weight and the size of the coil as far as possible from an economical point of view because it is mounted on the vehicle.

For this reason, it is necessary to make the superconducting coil winding portion in a form as compact as possible to increase the coil current density. For this purpose, a tightly wound structure is adopted in which a cooling medium such as liquid helium, etc., is placed in a space 3 formed by a cooling medium vessel 1 and an insulator 2 so that the coil winding portion 4 has no cooling medium brought directly into contact with the superconductor. Further, a so-called superconducting wire with a low copper to superconductor volume ratio is used, by which the volume of the part other than the part through which current is made flow, e.g., the volume of stabilizers, etc. is kept as small as possible.

On the other hand, a high reliability and stability is required for the superconducting coil for a magnetically levitated vehicle, because it must safely transport passengers. Therefore, it is required that the stability margin of the superconducting coil be greater than a disturbance energy. The stability margin means the smallest energy necessary for quenching the superconducting coil. However, a tightly wound superconducting coil with a low copper to superconductor volume ratio has a small stability margin and it can be quenched by a small disturbance energy.

In particular, because the superconducting coil for a magnetically levitated vehicle is used in a high speed running state, it is used under a severe conditions under which shock loads due to movements of the superconducting coil produced by mechanical vibration, tunnels, vehicles passing each other, etc. and a complicated disturbance energy due to wind pressure, vibration, etc. are applied thereto. However, it cannot be predicted in which part of the coil winding quenching will takes place, and neither a theory for stabilizing a tightly wound superconducting coil nor any specific measures for stably driving it have been established.

The inventors of the present application have found that the problem described above can be solved by increasing locally the stability margin of a coil winding portion which is apt to be quenched.

That is, it has been clarified that the resistance to quenching of the superconducting coil can be significantly improved by increasing the stability margin only at the surface portion of the winding so that quenching doesn't take place starting from the surface portion of the winding.

Specifically, it is possible to improve the endurance to quench of the superconducting coil by increasing the stability margin at the outer portions of the coil winding on two opposite sides of the coil winding with respect to the stability margin of a remaining part of the coil winding.

Further, it is possible also to improve significantly the resistance to quenching of the superconducting coil by increasing the stability margin of the outer portions of the coil winding on all sides of the coil winding so that quenching doesn't take place starting from the surface portion of the winding.

As a measure for varying the stability margin for the surface or outer portion and the other or remaining part of the coil winding, there is a method by which the amount of the stabilizer in the superconducting wire is varied therefor. That is, it can be achieved by making the transversal cross-section of the superconducting wire at the surface portion greater than the transversal cross-section of the superconducting wire at the other part. It can be achieved also by introducing high purity aluminum therein.

On the other hand, as a measure for increasing the stability of the surface portion of the coil winding, it is not always necessary to use a superconducting wire having a high stability margin for the surface portion of the winding, but the stability margin may be increased at the surface portion of the winding by taking any other measure, if it is achieved as a result. The other aspects of view of the present invention are based also on this idea and the stability margin may be varied for the surface portion of the winding and the other part by winding normal metal such as copper, aluminum, etc., around the surface portion of the superconducting coil winding.

To the superconducting coil for a magnetically levitated vehicle are applied movements of the superconducting coil produced by electromagnetic force or mechanical vibration at high speed running, shock loads due to tunnels, vehicles passing each other, etc., and various disturbances due to wind pressure, vibration, etc. The interior of the coil winding and the surface of the coil winding can be considered places in the superconducting wire where quenching is apt to take place. Since the winding of the superconducting coil has a tightly wound structure and it is impregnated with epoxy resin, movements of the superconducting wire due to electromagnetic force, etc., can be remarkably suppressed. Therefore quenching is unlikely to occur due to movements of the superconducting wire. On the other hand the surface portion of the coil winding is apt to be quenched by disturbances due to heat produced by friction between the insulator and the coil winding.

Consequently it is possible to improve significantly the resistance to quenching of the superconducting coil by increasing the stability margin of the whole surface portion of the coil winding so that quenching doesn't taken place starting from the surface of the coil winding.

Figure 6:
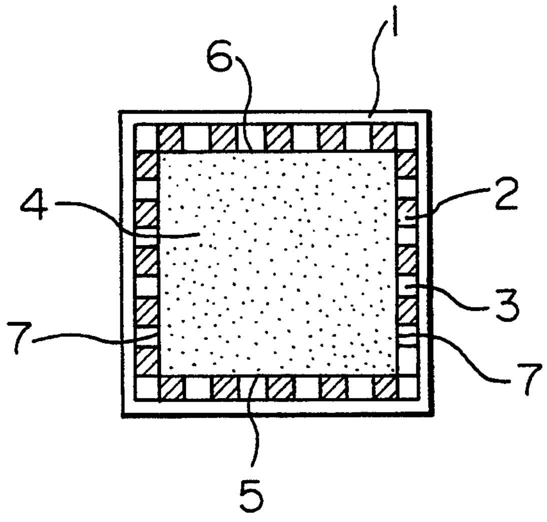
FIG. 6 is a cross-sectional view along a line VI–VI' in FIG. 5.

The transversal cross-section of the winding of the superconducting coil for a magnetically levitated vehicle is generally rectangular, as indicated in FIG. 6, and the coil winding 4 can be roughly divided into the outer portion 7 on two opposite sides of the coil winding and the other part 5 of the coil winding. In the case where the magnetically levitated vehicle runs at a high speed, quenching can be suppressed by increasing the stability margin of the coil winding specified by the analysis of complicated vibration modes such as rolling, pitching, yawing, etc., as described later.

As a measure for varying the stability margin for the surface portion and the other part of the coil winding, there is a method by which the amount of the stabilizer in the superconducting wire is varied therefor. It can be achieved by making the transversal cross-section of the superconducting wire at the surface portion greater than the transversal cross-section of the superconducting wire at the other part. It can be achieved also by introducing high purity aluminum therein. That is, since the electric resistivity of high purity aluminum is about 1/10 of that of high purity copper at an extremely low temperature and the thermal conductivity thereof is about 6.4 times as high as that of high purity copper, hot spots are hardly produced therein. Further aluminum has excellent properties as a stabilizer in that it is light with respect to copper owing to its small specific gravity, etc. Therefore, it is possible to increase locally the stability margin by covering the surface of a superconducting wire whose stabilizer is copper with a necessary amount of high purity aluminum.

Furthermore, considering the case where the superconducting coil is operated in a persistent current mode as for a magnetically levitated vehicle, and also from the point of view of the stability of the coil and the rate of current decay, it is more preferable that there are no connecting portions, i.e. splices, of the superconducting wire within the coil winding. This can be achieved by covering the surface of a superconducting wire having no connecting portions whose stabilizer is copper with a necessary amount of high purity aluminum.

In particular, in the magnetically levitated vehicle, in the case where it runs at a high speed, taking a Cartesian coordinate system, whose origin is the center of the superconducting coil, the x axis being in the direction of the propulsion of the vehicle, the z axis being in the upward direction, a propulsive force (Fx), a guidance force (Fy) and an up and downward force (Fz) act on the superconducting coil between the ground coil and it. On the other hand, as moments around the x, y and z axes a rolling moment (Mx), a pitching moment (My) and a yawing moment (Mz), respectively, act thereon. When the forces and the moments acting on the superconducting coil, produced by a current induced by the levitated coil, when the magnetically levitated vehicle runs at a constant speed of 500 km/h, are analyzed to obtain ratios among them, Fx:Fy:Fz=1:0.9:2.4 and Mx:My:Mz=1:2.1:1.4 are found on an average. Thus, it can be understood that all of them have a same order of magnitude. Consequently, a resultant force of these forces and moments acts on the superconducting coil, which produces relative displacements between the superconducting coil and the coil vessel so that heat is produced by friction. In this way it was understood that heat is produced by friction on a same order of magnitude at the whole surface portion of the coil winding, as described above. Therefore, in order to make the magnetically levitated vehicle run more stably, it is preferable to increase the stability margin at the whole surface portion of the coil winding.

Hereinbelow the superconducting coil device according to the present invention will be explained, referring to the attached drawings.

Figure 1:
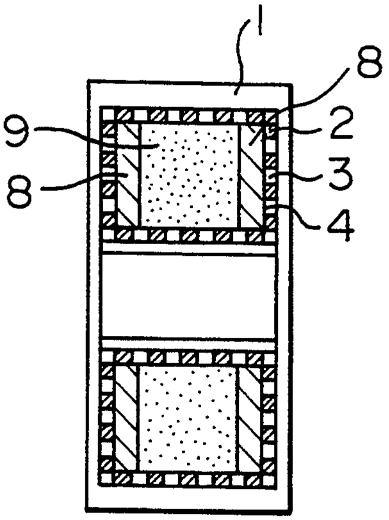
FIG. 1 is a cross-sectional view indicating the construction of a superconducting coil which is an embodiment of the present invention.

FIG. 1 shows a cross-sectional construction of a superconducting coil in the device according to the present invention. In FIG. 1, a coil winding portion 4 is composed of a central portion 9 of the winding and outer portions 8 on two opposite sides of the winding secured to a cooling medium vessel 1 through insulating members 2 and cooled by liquid helium 3 serving as a cooling medium.

EMBODIMENT 1

At first, superconducting wires B for the two extremity outer portions 8 of the winding and a superconducting wire A for the central part 9 of the winding in FIG. 1 were prepared as indicated below. That is, the superconducting wire A is one in which 1748 NbTi filaments, each of which has a diameter of 27 μm, are buried in high purity copper with a twist pitch of 21 mm, which is worked into a wire having a rectangular cross-section whose outer size is 1.1 mm×1.9 mm and whose surface is insulated thereafter with polyvinylformal about 40 μm thick. The wire has a copper ratio (=amount of stabilizing copper/amount of superconducting substance) of 1.0. On the other hand, each of the superconducting wires is obtained by covering the surface of the superconducting wire A described above with a high purity aluminum layer having a purity of 99.999%, 0.3 mm thick, fabricated by an extrusion process so as to have an outer size of 1.7 mm×2.5 mm and insulating it thereafter with a polyimide tape 25 μm thick wound on the surface thereof with turns overlapping each other by ½ of their width.

A superconducting coil P was obtained by winding the superconducting wire A and superconducting wires B in the construction indicated in FIG. 1 while connecting together by soldering so that each of the two outer portions 8 was constituted by the outermost 4 layers to obtain a tightly wound a circular superconducting coil having an inner diameter of about 100 mm, an outer diameter of about 210 mm, a length of about 90 mm, a number of layers of 36, a total number of turns of 1170 and an inductance of about 0.165 Henry and by impregnating it thereafter with epoxy resin a vacuum. The coil cross-section of the superconducting coil thus obtained was constructed so that the size thereof and cooling conditions were approximately identical to those required for the superconducting coil for a magnetically levitated vehicle. Further, in the two outer portions of the winding of this coil were buried heaters, each of which was constructed by winding bifilarly a silk-insulated manganin wire over 1 cm in the longitudinal direction.

In order to verify experimentally the stability of the superconducting coil according to the present invention, a tightly wound superconducting coil Q having an inner diameter of 100 mm, an outer diameter of 192 mm, a length of 68 mm, a number of layers of 36, a total number of turns of 1170 and an inductance of 0.163 Henry was prepared separately, which was fabricated by using only the superconducting wire A described above having a copper to superconductor volume ratio of 1.0, wound and impregnated with epoxy resin so as to obtain specifications as close as possible to those of the superconducting coil P described above. Heaters were buried also in this superconducting coil Q similarly to the superconducting coil P described above.

These superconducting coils P and Q were dipped into liquid helium and excited by DC current. It was possible to excite both of them up to 100% of the magnetic field-critical current characteristics of the superconducting wires. Further, in order to compare the stability of the superconducting wires under disturbances due to friction, etc., at the surface of the coil windings, the stability margin was measured while applying heater pulses of about 10 ms to the heaters described above buried in the superconducting coils P and Q. As the result, the stability margin at a coil current load ratio of 70% was 22 mJ/cm for the superconducting coil P and 3.0 mJ/cm for the superconducting coil Q. Thus, it was found that the superconducting coil P according to the present invention has a stability margin about 7 times as high as that obtained for the superconducting coil R according to the prior art technique.

EMBODIMENT 2

Figure 2:
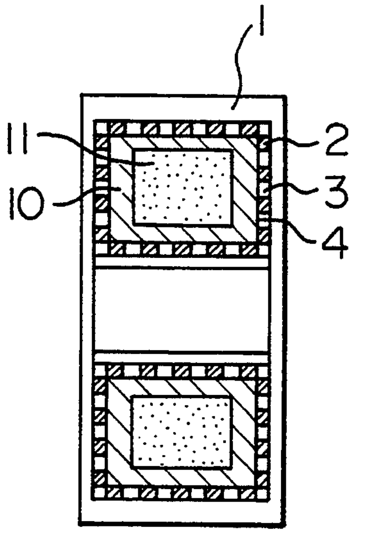
FIG. 2 is a cross-sectional view indicating the construction of a superconducting coil which is another embodiment of the present invention.

The superconducting wires A and B indicated in EMBODIMENT 1 were prepared and the superconducting wires B described above were wound in the construction indicated in FIG. 2 so that the surface portion 10 of the winding was constituted by the outermost 4 layers of the coil. On the other hand, the superconducting wire A was wound so as to constitute the central portion 11 other than the surface portion 10 of the winding in FIG. 2 while soldering it to the superconducting wires B and thus a superconducting coil R almost identical to the superconducting coil P in EMBODIMENT 1 was obtained by subjecting it to a treatment similar to that for the latter. Heaters identical to those described in EMBODIMENT 1 were buried also in the surface portion of the winding. Measurements of the stability margin were effected by the same method as that used in EMBODIMENT 1 and a stability margin almost equal to that of the superconducting coil P described in EMBODIMENT 1 was obtained.

EMBODIMENT 3

652 NbTi filaments, each of which has a diameter of 45 μm, were buried in high purity copper with a twist pitch of 36 mm, which was worked into a wire having a rectangular cross-section, whose outer size was 1.92 mm×2.8 mm, and whose surface was insulated with polyvinylformal about 40 μm thick. In this way a superconducting wire C having a copper to superconductor volume ratio of 3.9 was prepared separately.

A superconducting coil R′ having the same specifications as the coil indicated in EMBODIMENT 1 was fabricated by using the superconducting wire A described in detail in EMBODIMENT 1 for the central portion 11 in FIG. 2 and the superconducting wire C described above for the surface portion 10 of the winding. The same heaters as those described in EMBODIMENT 1 were buried also in this superconducting coil R′.

The stability margin at a coil current load ratio of 70% for the superconducting coil R′ described above was measured in the same way as in EMBODIMENT 1. and about 7.8 mJ/cm was obtained. Thus it was found that this coil has a stability margin about 2.4 times as high as that obtained for the superconducting coil Q using the superconducting wire A having a copper to superconductor volume ratio of 1.0 described in EMBODIMENT 1.

EMBODIMENT 4

A superconducting wire D having no connection (i.e. no splice) in the longitudinal direction and covered with a high purity aluminum layer 0.3 mm thick at predetermined places on the surface of the superconducting wire A indicated in EMBODIMENT 1 by a method similar to that used in EMBODIMENT 1 was wound previously so as to have the same specifications as the superconducting coil P. Thereafter it was impregnated with epoxy resin in a vacuum. In this way a superconducting coil S having almost the same specifications as the superconducting coil P described in EMBODIMENT 1. Measurements of the stability margin were effected using heaters having the same specifications as in EMBODIMENT 1, and a stability margin almost equal to that of the superconducting coil P described in EMBODIMENT 1 was obtained.

Further, the superconducting coil S and a persistent current switch fabricated separately were connected through a superconductivity-superconductivity connection so as to form a closed loop and operated in a persistent current mode at a flowing current of 500 A for about 200 hours. It was operated stably without quenching. Further, the time constant of current decay during operation was evaluated and about $5\times10^{11}$ sec was found.

EMBODIMENT 5

The superconducting wire A indicated in EMBODIMENT 1 was previously prepared and a superconducting wire E having no connection (i.e. no splice) in the longitudinal direction and covered with a high purity aluminum layer having a purity of 99.999%, 0.3 mm thick, at predetermined places on the surface of the coil winding in FIG. 2 in the coil cross-sectional construction indicated in EMBODIMENT 2 by a method similar to that used in EMBODIMENT 1 was fabricated. This superconducting wire E was wound so as to have the coil cross-sectional construction indicated in FIG. 2 in EMBODIMENT 2. Thereafter it was impregnated with epoxy resin in a vacuum to obtain a superconducting coil U having almost the same specifications as the superconducting coil P described in EMBODIMENT 1. Measurements of the stability margin were effected using heaters having the same specifications as in EMBODIMENT 1, and a stability margin almost equal to that of the superconducting coil S described in EMBODIMENT 4 was obtained. Further, the superconducting coil U and a persistent current switch fabricated separately were connected through a superconductivity-superconductivity connection so as to form a closed loop and operated in a persistent current mode at a flowing current of 500 A for about 200 hours. It was operated stably without quenching. Further, the time constant of current decay during operation was evaluated and a same result as that obtained in the preceding EMBODIMENT 4 was found.

EMBODIMENT 6

The superconducting wire A and the superconducting wires B were wound while connecting them through a superconductivity-superconductivity connection so as to have the same coil cross-sectional construction as the superconducting coil R in EMBODIMENT 2 using the same superconducting wires A and B as those used for the superconducting coil P indicated in EMBODIMENT 1. Thereafter it was subjected to impregnation treatment to obtain a superconducting coil V having almost the same specifications as the superconducting coil described in EMBODIMENT 2. Further, heaters were buried also in this superconducting coil V at the same places as in the superconducting coil P. The stability margin of the superconducting coil V was evaluated by the same method as in EMBODIMENT 1 and almost the same value as that obtained for the superconducting coil P was found. The time constant of current decay measured for the superconducting coil V by the method indicated in EMBODIMENT 4 was approximately the same as that obtained in EMBODIMENT 4.

EMBODIMENT 7

The superconducting wire A and the superconducting wires B were wound while connecting them through a superconductivity-superconductivity connection so as to have the same coil cross-sectional construction as the superconducting coil R in EMBODIMENT 2 using the same superconducting wires A and B as those used for the superconducting coil P indicated in EMBODIMENT 1. Thereafter it was subjected to impregnation treatment to obtain a superconducting coil W having almost the same specifications as the superconducting coil described in EMBODIMENT 2. Further, heaters were buried also in this superconducting coil W at the same places as in the superconducting coil R. The stability margin of the superconducting coil W was evaluated by the same method as in EMBODIMENT 1 and almost the same value as that obtained for the superconducting coil R was found. The time constant of current decay measured for this super-conducting coil by the method indicated in EMBODIMENT 4 was approximately the same as that obtained for superconducting coil V in EMBODIMENT 6.

EMBODIMENT 8

Figure 3:
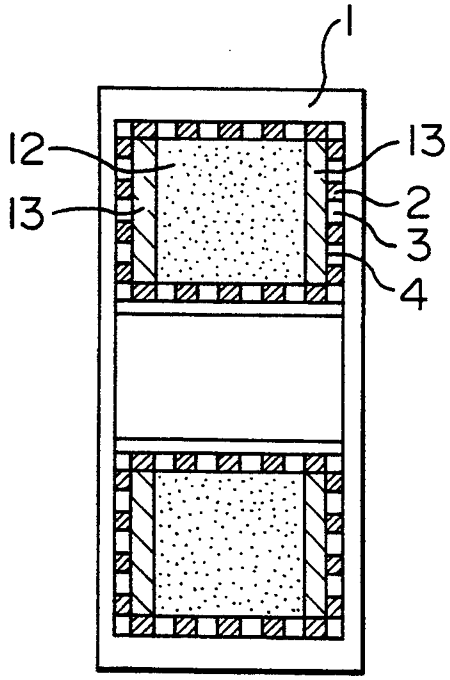
FIG. 3 is a cross-sectional view indicating the construction of a superconducting coil which is still another embodiment of the present invention.

An insulated copper wire having the same outer form and the same size as the superconducting wire A described in detail in EMBODIMENT 1 was fabricated previously. Two same winding portions (13 in FIG. 3) impregnated with epoxy resin were prepared by winding this copper wire in two layers. On the other hand, a coil (12 in FIG. 3) was prepared by winding the superconducting wire A indicated in EMBODIMENT 1 so as to have almost same specifications as the superconducting coil Q and arranged together with the copper winding portions described above so as to constitute the device indicated in FIG. 3. A superconducting coil X was fabricated by impregnating it thereafter with epoxy resin in a vacuum. Heaters described in detail in EMBODIMENT 1 were buried similarly in the copper winding portions. Energy was injected into the heaters up to 30 mJ/cm at a coil current load ratio of 70% similarly to EMBODIMENT 1 described previously and the superconducting coil described above was operated stably without quenching.

EMBODIMENT 9

A high purity aluminum wire having the same size as the copper wire used in EMBODIMENT 8 and a purity of 99.999%, whose surface was covered with a polyimide tape 25 μm thick wound around it with turns over-lapping each other by ½ of their width to insulate it, was prepared. A superconducting coil Y constructed by using it instead of the copper wire in EMBODIMENT 8 was fabricated. Heaters similar to those used in EMBODIMENT 8 were buried in the high purity aluminum wire. Similarly to EMBODIMENT 1, energy was injected into the heaters up to 40 mJ/cm at a coil current load ratio of 70% and the superconducting coil described above was operated stably without quenching.

EMBODIMENT 10

Figure 4:
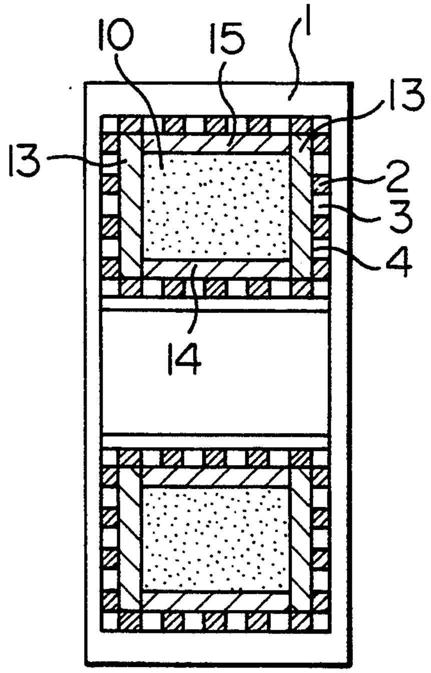
FIG. 4 is a cross-sectional view indicating the construction of a superconducting coil which is still another embodiment of the present invention.

An insulated copper wire having the same outer form and the same size as the superconducting wire A described in detail in EMBODIMENT 1 was fabricated. The copper wire described above was wound on a coil winding frame in two layers (14 in FIG. 4). Thereafter the superconducting wire A described in detail in EMBODIMENT 1 was wound so as to have almost same specifications as the superconducting coil Q (10 in FIG. 4). Further, the copper wire was wound on the outer surface thereof in two layers (15 in FIG. 4). Two windings were prepared, in which the copper wire described above was wound further in two layers and which were impregnated with epoxy resin (13 in FIG. 4). A superconducting coil Z was fabricated by arranging them so as to constitute the device indicated in FIG. 4 and by impregnating it thereafter further with epoxy resin in a vacuum. Heaters described in detail in EMBODIMENT 1 were buried similarly in the copper winding portions. Energy was injected into the heaters up to 30 mJ/cm at a coil current load ratio of 70% similarly to EMBODIMENT 1 described previously and the superconducting coil described above was operated stably without quenching.

EMBODIMENT 11

A high purity aluminum wire having the same size as the copper wire used in EMBODIMENT 8 and a purity of 99.999%, whose surface was covered with a polyimide tape 25 μm thick wound around it with turns overlapping each other by ½ of their width to insulate it, was prepared. A superconducting coil Z′ constructed by using it instead of the copper wire in EMBODIMENT 10 was fabricated. Heaters similar to those used in EMBODIMENT 8 were buried in the high purity aluminum wire. Similarly to EMBODIMENT 1, energy was injected into the heaters up to 40 mJ/cm at a coil current load ratio of 70% and the superconducting coil described above was operated stably without quenching.

Although in EMBODIMENTS 8 to 11 a copper or aluminum wire was used, the normal metal wire may be replaced by a normal metal plate made of copper, aluminum, etc., having throughholes.

As explained above, according to the present invention, since it is possible to realize a compact superconducting coil having a high stability, a high reliability, and a high current density as well as a magnetically levitated vehicle using it, an economical and social far-reaching effect thereof is remarkable.

We claim:

1. A tightly wound superconducting coil device comprising:

- a cooling medium vessel;
- a coil winding disposed in the cooling medium vessel, the coil winding including an unspliced superconducting wire and having a configuration such that a cooling medium disposed in the cooling medium vessel does not contact the unspliced superconducting wire; and
- an insulating member disposed between the coil winding and the cooling medium vessel;
- wherein a portion of the unspliced superconducting wire forming outer portions of the coil winding on two opposite sides of the coil winding has a composition which causes a stability margin of the outer portions of the coil winding to be greater than a stability margin of a remaining portion of the coil winding.

2. A tightly wound superconducting coil device comprising:

- a cooling medium vessel;
- a coil winding disposed in the cooling medium vessel, the coil winding including a superconducting wire and having a configuration such that a cooling medium disposed in the cooling medium vessel does not contact the superconducting wire; and
- an insulating member disposed between the coil winding and the cooling medium vessel;
- wherein a portion of the superconducting wire forming outer portions of the coil winding on two opposite sides of the coil winding includes a copper stabilizer and is covered with aluminum, thereby causing a stability margin of the outer portions of the coil winding to be greater than a stability margin of a remaining portion of the coil winding; and wherein the superconducting wire is an unspliced superconducting wire.

3. A tightly wound superconducting coil device comprising:

a cooling medium vessel;

a coil winding disposed in the cooling medium vessel, the coil winding including an unspliced superconducting wire and having a configuration such that a cooling medium disposed in the cooling medium vessel does not contact the unspliced superconducting wire; and an insulating member disposed between the coil winding and the cooling medium vessel;

wherein a portion of the unspliced superconducting wire forming outer portions of the coil winding on all sides of the coil winding has a composition which causes a stability margin of the outer portions of the coil winding to be greater than a stability margin of a remaining portion of the coil winding.

4. A tightly wound superconducting coil device comprising:

a cooling medium vessel;

a coil winding disposed in the cooling medium vessel, the coil winding including a superconducting wire and having a configuration such that a cooling medium disposed in the cooling medium vessel does not contact the superconducting wire; and an insulating member disposed between the coil winding and the cooling medium vessel;

wherein a portion of the superconducting wire forming outer portions of the coil winding on all sides of the coil winding includes a copper stabilizer and is covered with aluminum, thereby causing a stability margin of the outer portions of the coil winding to be greater than a stability margin of a remaining portion of the coil winding; and wherein the superconducting wire is an unspliced superconducting wire.

* * * * *